Oct. 18, 1966 P. W. NIPPERT 3,279,039

METHOD OF PRODUCING SEMICONDUCTOR MOUNTS

Filed Sept. 23, 1963 3 Sheets-Sheet 1

INVENTOR.
PAUL W. NIPPERT

BY Schmieding and Fultz
ATTORNEYS

Oct. 18, 1966 P. W. NIPPERT 3,279,039

METHOD OF PRODUCING SEMICONDUCTOR MOUNTS

Filed Sept. 23, 1963 3 Sheets-Sheet 2

INVENTOR.
PAUL W. NIPPERT
BY Schmieding & Fultz
ATTORNEY

METHOD OF PRODUCING SEMICONDUCTOR MOUNTS

Filed Sept. 23, 1963

INVENTOR.
PAUL W. NIPPERT
BY Schmieding & Fultz
ATTORNEY

United States Patent Office 3,279,039

Patented Oct. 18, 1966

3,279,039

METHOD OF PRODUCING SEMICONDUCTOR MOUNTS

Paul W. Nippert, Worthington, Ohio, assignor to The Nippert Electric Products Company, Columbus, Ohio, a corporation of Ohio Filed Sept. 23, 1963, Ser. No. 311,614
2 Claims. (Cl. 29—155.5)

This invention relates to improved methods for producing conductors and particularly to mounts for semiconductors and the like possessing uniquely high conductivity and strength at elevated temperatures.

This application is a continuation-in-part of my copending application, Serial No. 246,991 filed on December 26, 1962, now abandoned, and my copending applications Serial No. 813,552 filed May 15, 1959 and now abandoned, Serial No. 43,699 filed July 11, 1960, now Patent No. 3,199,000, and Serial No. 111,343 filed May 19, 1961, now Patent No. 3,197,843.

As one aspect of the present invention, conductors formed of copper zirconium alloy of the type disclosed in my United States Letters Patent No. 2,879,191 are produced by a continuous process wherein work pieces are passed through a furnace means in which they are first subjected to rapid heating in a higher temperature furnace heating zone that includes a hydrogen atmosphere and are next subjected to a cooler temperature hydrogen atmosphere cooling zone wherein they are relatively slowly cooled prior to release to atmosphere and ambient temperature.

It has been discovered that when the work pieces are subjected to this specific furnace treatment they produce conductors wherein the zirconium alloying agent is uniquely retained in solution during cooling notwithstanding the relatively slow cooling zone of the furnace. Moreover, the conductors are characterized by high thermal conductivity in the order of 91.1 I.A.C.S., fine recrystallized grain size of less than .020 millimeter average diameter, and hardness after cold working in the order of 95.6 Rockwell F.

As another aspect of the present invention a continuous furnace method is provided for producing improved composite conductors, such as mounts for semiconductors which mounts are compositely formed from copper alloy billets to which are fused weld rings formed of steel or other suitable metal. In accordance with the present invention the billet and weld ring components of such composite work pieces are fused together at the same time the billet component is solution annealed in the two zone furnace treatment previously described. The fusing of the ring to the billet occurs in the first hotter furnace zone and the second colder furnace zone serves to gradually cool and thereby prevent thermal cracking of the fused zone at the junction of the weld ring and billet. In addition, the second colder furnace zone results in a composite copper alloy work piece wherein the zirconium is retained in solution and which is characterized by the previously described high conductivity, small grain size, and cold workability, all these being achieved without rapid quenching or aging.

Such retention in solution with the copper of an alloying agent uniquely occurs in this zirconium-copper alloy whereas in other known copper alloys of the precipitation type the alloying agents do not remain in solution when slow cooled after being subjected to solution annealing temperatures.

The method of the present invention uniquely utilizes this novel characteristic in producing composite conductors having brazed or fused junctions in that said acceptable slow cooling prevents thermally imposed fracturing of said junctions.

After the composite work piece is removed from the furnace means to ambient temperatures it is cold worked in a suitable confining die to form it to semiconductor mount configuration that includes a platform portion having a centrally disposed pedestal and stem portion on the opposite side of the pedestal.

It has been found, in actual practice, that when an attempts is made to extrude a stem, without first preforming the pedestal, the metal opposite the stem being formed, is sucked toward the stem, and this results in creating a "sink hole" on the side of the mount opposite the stem. This sink hole is undesirable in that it creates the necessity of another machining operation to provide a flat surface for the semiconductor. Also it has been found, in actual practice, that when a pedestal is preformed on the billet, the metal opposite the stem is not sucked toward the stem during the stem extruding process, i.e., the surface of the platform remains flat.

As still another aspect of the present invention it has been discovered that the controlled furnace treatment described above provides means for brazing a different metal element, such as a weld ring formed of steel or nickel, to a copper zirconium alloy billet taking the alloying agent zirconium into solution at the brazing temperature and also refining the grain structure.

It is therefore an object of the present invention to provide an improved method for producing conductors that are characterized by high thermal conductivity in the order of 91.1 I.A.C.S., fine recrystallized grain size of less than .020 millimeter average diameter, and hardness after cold working in the order of 95.6 Rockwell F.

It is another object of the present invention to provide an improved method for producing mounts for semiconductors of composite construction of the type which includes a weld ring component thermally fused to a copper alloy billet component. In accordance with the present invention the finished mounts possess high strength which permit their threaded stems to be wrench tightened in threaded holes in a heat sink without rupture due to torsional stresses.

It is another object of the present invention to provide an improved method for producing mounts for semiconductors wherein copper alloy billets are simultaneously solution annealed and brazed to different metal weld rings to form in a simple economical manner a composite thermally fused work piece that can be subsequently cold worked into a uniformly hardened semiconductor mount.

It is still another object of the present invention to provide an improved method for producing conductors from copper zirconium alloy which method retains the zirconium in solution thereby retaining the cold workability and conductivity.

It is still another object of the present invention to provide an improved method for producing conductors from copper zirconium alloy wherein the work pieces are released from a solution annealing furnace or from a solution annealing and brazing furnace without the occurrence of scaling or substantial discoloration. This desirably provides means for producing brightly finished parts without the need of special pickling baths.

Further objects and advantages of the present invention will be apparent from the following description, reference being had to the accompanying drawings wherein preferred forms of embodiments of the invention are clearly shown.

Figure 1:
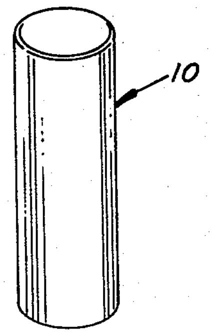
FIG. 1 through 7 illustrates successive steps in the formation of a copper alloy billet, FIG. 1, into a finished composite semiconductor mount, FIG. 7.

Referring in detail to the drawings, a semiconductor mount in accordance with the present invention is formed by starting with a billet or work piece, indicated generally at 10 in FIG. 1, which is preferably cut to metered length from drawn copper zirconium wire stock, said alloy being of the type disclosed in my United States Letters Patent 2,879,191 dated March 24, 1959.

Figure 2:
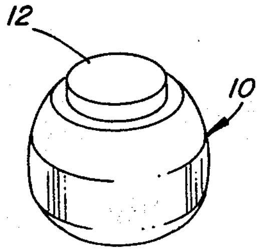
Figure 3:
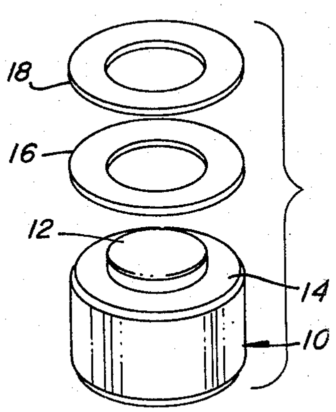

The billet is formed to the configuration of FIG. 3 which includes an upwardly extending pedestal or protrusion 12 surrounded by an annular weld ring supporting surface 14. Cold heading has been found to be a suitable means for forming the billet, first to the configuration of FIG. 2 in a first header die and next to the configuration of FIG. 3 in a second header die, it being understood that the billet can be formed by other means without departing from the spirit of the present invention.

It will be noted that ring location surface 14 is already positioned after this first operation. Wire of 0.343-inch diameter is used to make $^{11}/_{16}$-inch bases and wire of 0.243-inch diameter is used to make $^{7}/_{16}$-inch bases. Very close tolerances are maintained on the formed diameters.

The shaped billets produced by the "header" are placed in a wire basket vapor degreased with trichloroethylene in a small conventional vapor degreaser.

The billets are next taken to the brazing furnace where a woven wire belt passes over a table on the entry end of the brazing furnace. Operators lay the pieces billets 10, FIG. 3, side up on the belt, and drop on each a braze-alloy ring 16 and a welding ring 18 seen in FIG. 3.

The brazing furnace chamber is provided with an atmosphere of cracked ammonia (75 percent hydrogen, 25 percent nitrogen, by volume) which burns at the entrance and exit slots.

Figure 4:
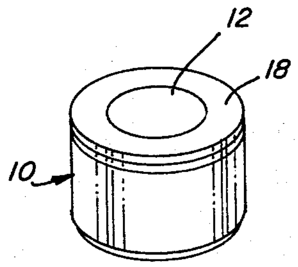
Figure 5:
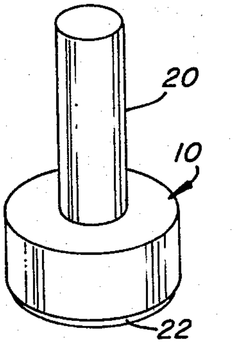
Figure 6:
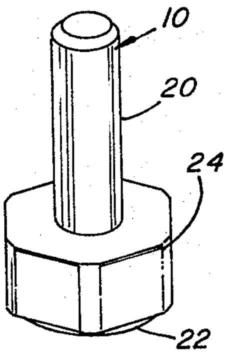

The temperature in the furnace is controlled automatically. At the entrance end of the chamber the assembled parts of FIG. 3 are heated and cleaned by the hydrogen before the silver alloy melts, and brazing takes place in the hot central zone. Parts are next cooled in the hydrogen atmosphere of a chamber in an exit end of the furnace until they show no red color when viewed through the exit slot. When they reach this slot they immediately pass over a water-cooled pulley and drop into a tank of water delivered directly to atmosphere at ambient temperatures. The brazed assembly is shown in FIG. 4.

In the hot central zone of the furnace the temperature is retained at between 1350 and 1550 degrees F. with 1480 degrees being a preferred production temperature. In passing through the cooler exit zone the work pieces are cooled from 1480 degrees F. to between 150 and 250 degrees F. An eighteen-inch belt travel for about three minutes has been found to be a satisfactory production cooling zone cycle for semiconductor mounts.

The parts from the previous step are washed thoroughly in water and then spin dried in a small centrifuge basket.

The cleaned parts are loaded into another tumbling barrel with a measured quantity of purified tallow. Each piece must acquire a very light and uniformly distributed film of the lubricant in this step.

Figure 12:
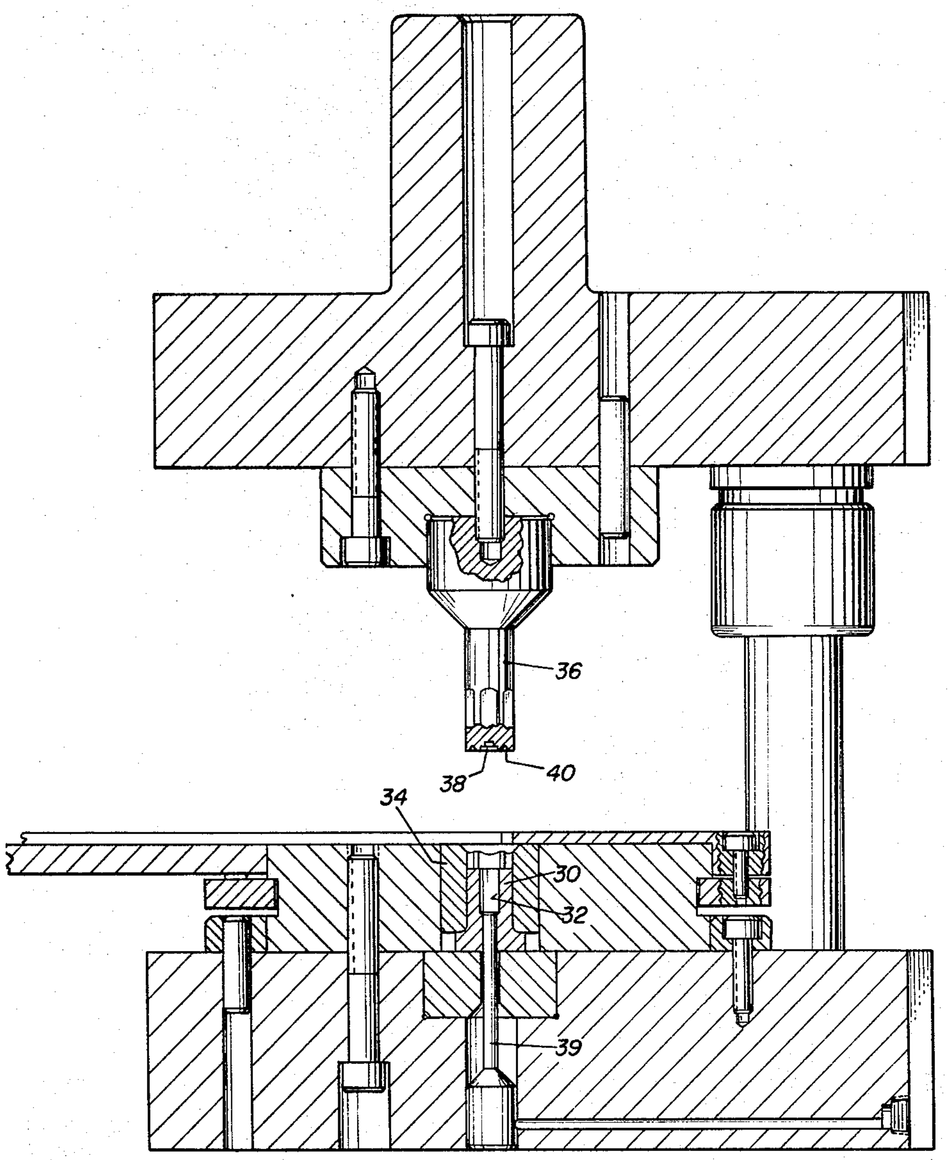
FIG. 12 is a view partly in section showing a typical confining die used for changing the billet from the form shown in FIG. 4 to the form shown in FIG. 6.

The lubricated slugs with the welding ring brazed in place are then fed into a confining die of a rapid-acting hydraulic press. Here a combination of press forming and extrusion produces the stem 20. A typical confining die is shown in FIG. 12. The insert 30 is provided with a flat top for supporting the assembly, as shown in FIG. 4. The assembly is placed on top of the flat top of insert 30 with the pedestal extruding upwardly. The insert 30 is recessed to form the hollow as shown at 32. This recess extends at right angles to the substantially flat top of the insert 30. Insert 30 is disposed within an insert 34 which latter insert is hexagonal in horizontal cross section above the top of insert 30. The finishing punch 36 is also hexagonal in horizontal cross section and complements the upper part of insert 34 and is received thereby. The bottom of punch 36 is recessed as at 38 for receiving the pedestal 12 of the billet and a circular V-shaped in cross section recess 40 surrounds the recess 38.

When the finish punch is forced downwardly, preferably under hydraulic mechanism, the stem will be formed by pushing billet material into the cavity 32 in the insert 30. Also the circular top is formed to hexagonal shape, at the same time a push out pin 39 moves upwardly automatically at the conclusion of each forming operation. It engages the bottom of the stem and pushes it out of the die.

Figure 14:
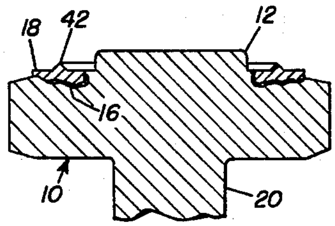
FIG. 14 is a cross section view, on a larger scale, of the mount shown in FIG. 6, but inverted.

The result of this pressure on the top of the billet and weld ring 18 is depicted in FIG. 14. It will be observed that a circular weld ring projection 42 is formed due to the recess. It will also be observed that the top surface of the pedestal is not distorted, i.e., it remained flat. Thus machining of the top surface has been eliminated whereby a disc of semiconductor material may be applied without further machine operation. Too, it will be seen that the weld ring 18 and silver solder 16 were caused to flow. In this manner the weld ring is not only held in position by the brazing operation but it is also mechanically locked in position. It will be observed also that since the top of the insert 30 is flat or substantially flat, the bottom of the workpiece will be pressed substantially flat from the perimeter to the root of the stem 20 whereby intimate electrical and thermal association is assured between the mount and the heat sink to which it is fixed.

Figure 15:
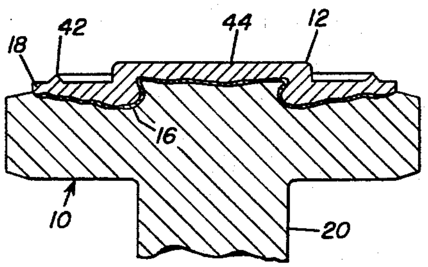
FIG. 15 is a view similar to FIG. 14 but showing a steel or nickel cap for the pedestal, which cap is formed integrally with the weld ring.

The same process is carried out in which a cap 44 (see FIG. 15) is formed integrally with the welding ring 18. Again it will be observed that the top surface of the cap 44 is not distorted.

Figure 16:
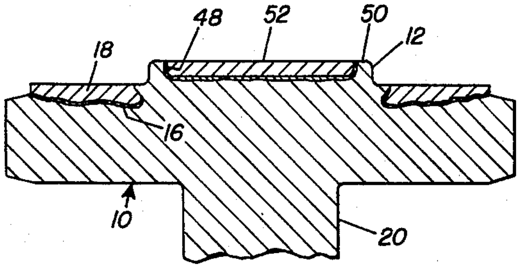
FIG. 16 is a view similar to FIG. 14 but showing the pedestal provided with a central recess, which recess carries a molybdenum disc.

In FIG. 16, the top of the pedestal 12 is provided with a circular recess 48 to form a circular rim or bead 50. The recess carries a disc of molybdenum 52 which is brazed in position concomitantly with the brazing of ring 18 in position. The silver solder is shown at 16. Here again the top surface of the disc 52 was not distorted during the process of forming the stem 20.

Figure 17:
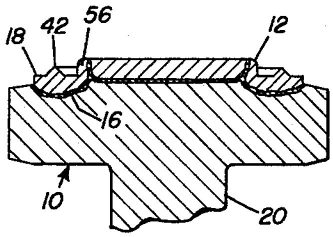
FIG. 17 is a view similar to FIG. 14 but showing the top of the pedestal carrying a molybdenum disc formed at the periphery thereof by the weld ring.

FIG. 17 shows the welding ring 18 provided with an integrally formed rim or bead 56, preformed substantially so that slope and like bead restrains the spreading of the molybdenum during the stem forming operation. It will be observed that the top surface of the molybdenum was not distorted during the process of forming the stem.

Figure 13:
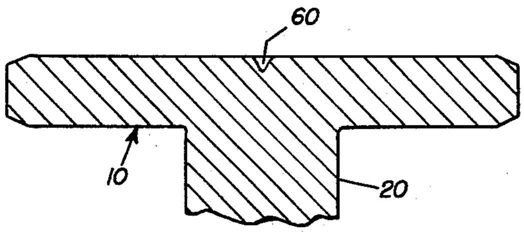
FIG. 13 is a cross section view of a mount, on a large scale, which was formed without the central pedestal and showing the "sink hole" created during the process of extruding the stem.

FIG. 13 is a cross sectional view of a mount, the stem of which was formed as described with respect to FIG. 14 to 17 but the billet did not include a pedestal. During the stem forming process, the metal opposite the stem being formed was sucked downwardly resulting in an undesirable "sink hole" 60. Some samples were far more distorted than that shown at 60. By providing the pedestal 12 on the billet and the recess 38 in the finishing punch 36, there is a tendency for the material of the pedestal to flow upwardly toward the recess 38 during the time that the stem is being extruded. Thus the top surface of the pedestal conforms to the shape of the recess 38.

The stem 10 is cut to the correct length on an automatic screw machine converted to a chucker. No other excess material need be removed.

An automatic screw machine is used to machine bevels on the edges of the hexagonal head and the stem, and to remove any burrs.

Figure 7:
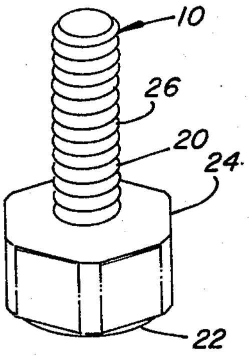
Figure 8:
FIG. 8 is a photomicrograph showing the grain structure of the wire billet of FIG. 1.
Figure 9:
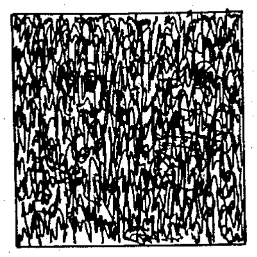
FIG. 9 is a second photomicrograph showing the grain structure of the billet after it has been cold headed to the configuration of FIG. 2.
Figure 10:
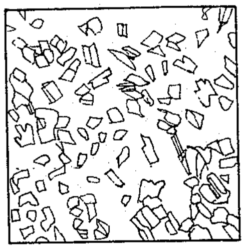
FIG. 10 is another photomicrograph showing the grain structure of the billet after it has been treated in a furnace in accordance with the present invention.
Figure 11:
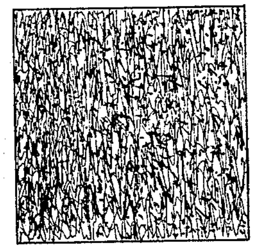
FIG. 11 is another photomicrograph showing the billet after it has been cold worked to form the stem as seen in FIG. 5.

As a final forming operation the threads 26 are rolled on stem 20 as shown in FIG. 7.

Reference is next made to Tables 1 and 2 which were made in the course of developing the method of the present invention. These tests determined that relatively slow cooling, as contrasted to rapid quenching, had no effect whatsoever on hardness or microstructure, and a negligible effect on electrical conductivity of the copper zirconium conductors formed in accordance with the method of the present invention.

The copper zirconium wire stock was straightened and cut into 10 specimen billets, each over 2½ inches long, after discarding the point that was damaged in drawing. These pieces were cross rolled cold to 0.200-inch-thick strip. The pieces were annealed, one at a time, in a hydrogen-nitrogen atmosphere at 1480 F. (805 C.) for 7 minutes. Annealing times did not vary more than minus 0 plus 10 seconds, as they were removed from the furnace and plunged into cold water, or into a contiguous furnace zone held at a lower temperature for a definite delay time, as indicated in Table 1. Except Specimen No. 10, all specimens were quenched in water at the end of the heating period. The pieces were then dipped briefly in 1.1 hydrochloric acid to remove a very light tarnish.

Following the annealing treatment all of the specimens were cold rolled lengthwise to 0.100 inch thickness (50 percent reduction). After this treatment, all of the specimens were returned to the hydrogen atmosphere furnace in a group and aged two hours at 800 F. (425 C.). They were then quenched in water.

Rockwell F hardness was determined on each specimen as received after cold rolling to flat 0.200-inch-thick strip, after annealing, after cold rolling to 50 percent reduction, and after the two hour aging treatment. The results are set forth in Table 2. Finally, Speciments 1–5, inclusive, were ground on the edges, but not the flat sides, and straightened with as little bending as possible.

The electrical conductivity was determined at room temperature on these specimens and is set forth in Table 2.

The microstructure of Specimens 1 and 10 were undistinguishable one from the other. Both had a recrystallized grain size of about 0.012 mm. average diameter. Both showed some scattered blue precipitate, presumably $Cu_3Zr$, that apparently never was in solution. There was no new precipitate in either.

Typical microstructures of a work piece at various stages of formation of an actual production conductor are shown in FIGS. 8–11, the magnification being 150 times.

The electrical conductivity of Specimen 1 appeared to be slightly lower than that of the other specimens measured. Because the specimens were difficult to measure with great accuracy, we do not consider that this difference is significant.

The only possible conclusion that could be drawn from the tests is that the alloy is almost completely insensitive to quenching rate after solution annealing at 1480 F. (805 C.). This temperature probably is too low to develop maximum mechanical properties, although the electrical conductivity is surprisingly high. However, the treatment produces metal highly satisfactory for its intended use, and the parts are completely devoid of sub-surface scaling.

TABLE 1.—HARDNESS OF COPPER ZIRCONIUM WORK PIECES BEFORE AND AFTER EXPERIMENTAL ANNEALING AND AGING

| Specimen | Rockwell F, as received | Rockwell F, after rolling to 0.200 in. | Annealed 7 min. at 1,480 F. in hydrogen atmosphere, cooled as follows | Rockwell F, after anneal and cooling | Rockwell F, after rolling to 0.100 in. | Rockwell F, after aging 2 hrs., 800 F. |
|---|---|---|---|---|---|---|
| 1 | 74.6 | 92 | Water quench from solution annealing temperature. | 50 | 94 | 95.3 |
| 2 | 80.6 | 93.6 | Removed to 800 F. zone for 1.5 min. water quenched. | 51.6 | 94 | 95.6 |
| 3 | 90 | 92.6 | Removed to 800 F. zone for 3 min., water quenched. | 52 | 94.6 | 95.3 |
| 4 | 89.6 | 92.6 | Removed to 800 F. zone for 5 min., water quenched. | 52 | 95 | 95 |
| 5 | 90 | 96 | Removed to 800 F. zone for 8 min., water quenched. | 53 | 95 | 96 |
| 6 | 90 | 95 | Removed to 250 F. zone for 1.5 min., water quenched. | 54 | 94 | 94 |
| 7 | 88.6 | 93.6 | Removed to 250 F. zone for 3 min., water quenched. | 53.3 | 95 | 95 |
| 8 | 89 | 93.3 | Removed to 250 F. zone for 5 min., water quenched. | 54.6 | 95.3 | 95 |
| 9 | 89 | 92.6 | Removed to 250 F. zone for 8 min., water quenched. | 52 | 94.6 | 95.3 |
| 10 | 89 | 94 | Cooled in room temperature in hydrogen atmosphere. | 55 | 95 | 95t |

TABLE 2.—ELECTRICAL CONDUCTIVITY OF COPPER ZIRCONIUM WORK PIECE AFTER ANNEALING AND AGING [1]

| Specimen Number | Resistivity at 26 C., microhm-cm. | Conductivity at 26 C., ohm$^{-1}$-cm.$^{-1}$ $\times 10^{-4}$ | Calculated [2] Resistivity at 20 C., microhm-cm. | Conductivity, percent IACS |
|---|---|---|---|---|
| 1 | $1.88_3$ | 53.1 | $1.84_6$ | 93.4 |
| 2 | $1.86_8$ | 53.5 | $1.83_1$ | 94.0 |
| 3 | $1.86_3$ | 53.7 | $1.82_6$ | 94.4 |
| 4 | $1.86_3$ | 53.7 | $1.82_6$ | 94.4 |
| 5 | $1.86_3$ | 53.7 | $1.82_6$ | 94.4 |

[1] See Table 1 for annealing and aging procedures.

[2] Where $P_1=P_2(1+\alpha.\Delta t)$,
$P_1$=resistivity at 26 C.
$P_2$=resistivity at 20 C.
$\alpha$=0.00363*
$\Delta t$=6
or
$P_2=P_1\div 1.02$
and
Percent $IACS=(1.7241\div P_2)$ 100

*Measurements made at 26 C. have been converted to 20 C. using the value of 0.00363 for the temperature coefficient of resistivity, $\alpha$, in the formula $p=p_0(1+\alpha t)$. Results of these tests are shown in Table 2.

A subsequent test was made on a work piece of the same copper zirconium alloy which was subjected to the same processing except that the heat-treating step was to be carried out in a continuous production furnace and the aging step (2 hours at 800 F.) was omitted.

Two pieces from the same wire (0.343-inch diameter) used for the previous determinations were cross rolled into strip 0.20 inch thick and heat treated. They were next rolled lengthwise into strip 0.100 inch thick. Rockwell F hardness after rolling was 95.6 (average of traverse in which individual readings varied from 95.0 to 95.9+). Electrical conductivity was determined only on the straightest (No. 12) of the two samples, which were otherwise identical. Results of this measurement as shown below:

Specimen Number 12:

| | |
|---|---|
| Resistivity at 26 C., microhm-cm. | $1.93_1$ |
| Conductivity at 26 C., ohm$^{-1}$-cm.$^{-1}\times 10$ | 51.8 |
| Calculated resistivity at 20 C., microhm-cm. | $1.89_2$ |
| Conductivity, percent I.A.C.S. | 91.1 |

It was thereby determined that the electrical conductivity of the work pieces was still very high even with the deletion of the aging step of Table 1.

I claim:

1. The steps in the method of forming an annealed electrical conductor assembly including an alloy of zirconium copper and a metal element brazed thereon and which alloy is partially aged during the cooling period after annealing and which is adapted to be cold worked and thereby work hardened without the additional step of quenching or age hardening, which steps consist in forming a work piece from an alloy of about .01 to about .15 percent zirconium and the balance refined copper having an electrical conductivity equal to that of electrolytically refined copper; positioning a blank of fusible brazing material on said work piece; positioning a metal element on said blank of fusing material to form a conductor assembly, positioning said composite conductor in a rapid heating zone having a value sufficiently high to fuse the brazing material and having a reducing atmosphere to solution anneal said work piece and simultaneously heat fuse said metal element to said work piece by the fusible brazing material; positioning said composite conductor in a temperature cooling zone of a value below the fusing temperature of the brazing material and having a reducing atmosphere to relatively slow cool the fused assembly and partially age said conductor; and removing said composite conductor to an ambient temperature zone.

2. The steps in the method as defined in claim 1, characterized in that the rapid heating zone is maintained between 1350° and 1550° F. and that the cooling zone is maintained between 150° and 250° F.

References Cited by the Examiner

UNITED STATES PATENTS

| | | | |
|---|---|---|---|
| 2,117,106 | 5/1938 | Silliman | 148—160 X |
| 2,145,792 | 1/1939 | Hensel et al. | 148—160 X |
| 2,637,672 | 5/1953 | Losco et al. | 148—12.7 |
| 2,879,191 | 3/1959 | Nippert et al. | 148—11.5 |
| 2,984,474 | 5/1961 | Emerson | 266—5 |
| 3,130,250 | 4/1964 | Mescher | 266—5 |
| 3,197,843 | 8/1965 | Nippert | 29—155.5 |
| 3,199,000 | 8/1965 | Nippert | 317—234 |

JOHN F. CAMPBELL, *Primary Examiner.*